United States Patent [19]
Campinos et al.

[11] Patent Number: 6,035,038
[45] Date of Patent: Mar. 7, 2000

[54] CONDITIONAL ACCESS SYSTEM AND SMARTCARD ALLOWING SUCH ACCESS

[75] Inventors: Arnaldo Campinos; Jean-Bernard Fischer, both of Rennes, France

[73] Assignee: Thomson multimedia S.A., France

[21] Appl. No.: 08/884,343

[22] Filed: Jun. 27, 1997

[30] Foreign Application Priority Data

Jun. 28, 1996 [FR] France ................................. 96 08053

[51] Int. Cl.⁷ .......................... H04N 7/167; H04L 9/08; H04L 9/32
[52] U.S. Cl. ................................. 380/16; 380/9; 380/10; 380/20; 380/21; 380/23; 380/25; 380/49; 235/380; 340/825.31; 340/825.34; 348/6
[58] Field of Search .............................. 380/4, 9, 10, 16, 380/20, 21, 23, 25, 49, 50, 59, 24; 235/379, 380; 340/825.31, 825.34; 348/6, 391

[56] References Cited

U.S. PATENT DOCUMENTS

| | | | |
|---|---|---|---|
| 3,845,277 | 10/1974 | Voss et al. | 235/379 |
| 3,941,977 | 3/1976 | Voss et al. | 235/379 |
| 4,323,921 | 4/1982 | Guillou . | |
| 4,809,327 | 2/1989 | Shima | 380/21 X |
| 4,947,428 | 8/1990 | Guillou et al. | 380/20 |
| 5,224,161 | 6/1993 | Daniel et al. | 380/20 X |
| 5,243,650 | 9/1993 | Roth et al. | 380/10 X |
| 5,588,058 | 12/1996 | Le Berre | 380/20 |
| 5,793,427 | 8/1998 | Mills et al. | 348/391 |

FOREIGN PATENT DOCUMENTS

| | | |
|---|---|---|
| 375539A | 6/1990 | European Pat. Off. . |
| 461029A | 12/1991 | European Pat. Off. . |
| 506435A | 9/1992 | European Pat. Off. . |
| 2582936 | 6/1985 | France ........................... H04N 7/167 |
| 2583946 | 6/1985 | France ........................... H04N 7/167 |
| WO 9528058A | 10/1995 | WIPO . |

OTHER PUBLICATIONS

Ute C90–007, dated Jan. 1994, published by "Union Technique de L'Electricite" entitled "Access control system for digital broadcasting systems" translated into English.
French Patent Office Search Report—Mar. 10, 1997.
A Derwent Abstract of reference AM in English language.
UTE C90–007, dated Jan. 1994, published by "Union Technique de l'Electricité" entitled "Access control system for digital broadcasting systems" in French language.

Primary Examiner—Bernarr E. Gregory
Attorney, Agent, or Firm—Joseph S. Tripoli; Peter M. Emanuel; David T. Shoneman

[57] ABSTRACT

The conditional access system of the present invention allows a service provider to supply services, which may be scrambled by a control word, only to those users who have acquired entitlements to these services. The control word is supplied in Entitlement Control Messages (ECM) after having been encrypted using a key. The entitlements of each user are forwarded in Entitlement Management Messages which contain the key. The conditional access system verifies and validates the ECM and EMM prior to processing the control word.

8 Claims, 4 Drawing Sheets

CONDITIONAL ACCESS SYSTEM AND SMARTCARD ALLOWING SUCH ACCESS

BACKGROUND OF THE INVENTION

The present invention relates to a conditional access system.

A conditional access system allows a service provider to supply services only to those users who have acquired entitlements to these services. Such is the case, for example, for pay television systems.

As is known to those skilled in the art, the service supplied by a service provider consists of an item scrambled by control words. The scrambled item can only be descrambled, and hence read by the user, at the level of the entitlements allocated to this user. The scrambled item will hereafter be denoted IE(ECG), where ECG represents the unscrambled item (the abbreviation ECG standing for "Electronically Coded Good").

In order to descramble the item, the service provider supplies each user with the control words which served for scrambling the item. To keep the control words secret, they are supplied after having been enciphered with an algorithm with key K. The various enciphered control words are forwarded to the various users in messages commonly denoted ECM (the abbreviation ECM standing for "Entitlement Control Messages").

In order to grant access to his service only to authorized users alone, the service provider supplies a smartcard and a decoder to each of the users.

The smartcard makes it possible, on the one hand, to validate and record the entitlements which the user has to the service delivered and, on the other hand, to decipher, with the aid of the key K, the enciphered control words. For this purpose, the smartcard therefore contains the key K of the algorithm which allowed encipherment of the control words.

The decoder, for its part, makes it possible to descramble the scrambled item on the basis of the item consisting of the deciphered control words emanating from the smartcard.

The entitlements of each user are forwarded in messages commonly denoted EMM (the abbreviation EMM standing for "Entitlement Management Messages").

According to the known art, the EMM dedicated to a user contains three main items:

a first item giving the address of the user's card;

a second item giving the description of the user's entitlements;

a third item making it possible to validate the EMM and to verify that the user's entitlements contained in the EMM are indeed the entitlements reserved for the user.

When a user's decoder recognizes the address of the card associated with him from among the various addresses dispensed by the service provider, the EMM corresponding to the recognized address is analysed. The analysis of the EMM is performed with the aid of an analysis algorithm which depends on the key K for enciphering the control words.

The key K of the algorithm for enciphering the control words is contained in each user card. It follows that piracy in relation to a single card may lead to the ascertaining of the key K. Illicit user entitlements may then be created and recorded on all the other cards supplied by the service provider and containing the same key K. It is also possible to copy over onto these other cards the user entitlements contained in the pirated card. The service supplied by the provider is then no longer protected.

In order to alleviate these drawbacks, it is known for the service provider to modify, at regular time intervals, the key of the algorithm for enciphering the control words. The service provider must then supply each user with a new card containing a new key K.

This represents a drawback, especially in terms of costs, since the number of user cards is often very high. This number may in fact frequently reach several hundred thousand, or even several million.

FIG. 1a represents a first EMM format according to the prior art.

The EMM represented in FIG. 1a is composed of a body C1a containing the three main items mentioned earlier, and of a header 4, the content of which (H1) gives, among other things, the type and size of the items contained in the body C1a.

The body C1a consists of a first item 1 containing the address (AD) of the user's card, of a second item 2 containing a description of the user's entitlements, and of a third item 3 containing a cue $HASH_K$. The cue $HASH_K$ depends on the key K and makes it possible to perform the analysis of the EMM mentioned earlier.

FIG. 1b represents a second EMM format according to the prior art.

The EMM consists of a header 4 and of a body C1b.

The body C1b consists of the items 5 and 6 containing respectively the address AD of the user card and the description of the user's entitlements enciphered with the algorithm with key K and relating to the address AD (E(user's entitlements)$_{K,AD}$). According to this EMM format, the validation and verification of the entitlements contained in the EMM are performed by the operation of deciphering the enciphered entitlements.

FIG. 2 represents the format of an ECM according to the prior art.

The ECM consists of a body C2 and of a header 7, the content (H2) of which gives, among other things, the type and size of the items contained in the body C2.

The body C2 comprises, among other things, a first item 8 containing the set of access conditions associated with the service supplied by the service provider, a second item 9 containing a control word Cwi enciphered with the algorithm with key K ($E(Cwi)_K$) and a third item 10 containing a cue $HASH_K$ depending on the key K and making it possible to validate and verify the content of the access conditions. The control word Cwi represents the current control word, that is to say the control word making it possible to descramble that part of the program which is currently being read.

As is known to those skilled in the art, generally the ECM which contains Cwi also contains a second control word. This second control word is the control word of the next descrambling period, that is to say the current control word of the ECM which has to follow the ECM which contains Cwi as current control word. This second control word has not been represented in FIG. 2 so as not to fruitlessly encumber the drawing.

As is known to those skilled in the art, the ECMs are forwarded by the service provider together with the scrambled item IE(ECG).

The ECM format described in FIG. 2 is merely one example of an ECM format. In particular, the order of the various blocks (7, 8, 9, 10) making up the ECM described in FIG. 2 can be modified.

FIG. 3 represents the schematic of a user card according to the prior art.

The user card 11 contains five main circuits:

a circuit 12 for validating the user's entitlements;

a circuit 13 for storing the user's validated entitlements;

a circuit 14 for controlling the access;

a circuit 15 for validating the ECMs;

a circuit 27 for deciphering the enciphered control words.

Regardless of the format of the EMM (cf. FIGS. 1a and 1b), the validation circuit 12 makes it possible to perform on the EMMs the operations mentioned earlier of user address recognition and analysis of the user's entitlements. For this purpose, the validation circuit 12 contains the key K of the encipherment algorithm. If the EMM is validated, the user's entitlements contained in the EMM are stored in the circuit 13 for storing the validated entitlements.

The circuit 15 for validating the ECMs makes it possible to perform on the access conditions 8 contained in the ECMs, operations identical to those performed by the validation circuit 12 on the user's entitlements. The validation circuit 15 contains the key K.

The deciphering circuit 27 makes it possible to decipher the control words. For this purpose, the deciphering circuit 27 also contains the key K of the algorithm for enciphering the control words.

The access control circuit 14 compares the validated access conditions with the validated entitlements of the user. If the validated access conditions correspond to the validated entitlements of the user, a signal S, emanating from the access control circuit 14 and applied to the deciphering circuit 27, authorizes the deciphering of the enciphered control words $E(Cwi)_K$ originating from the validation circuit 15. In the contrary case, the signal S does not authorize deciphering.

On completion of the various steps of the deciphering procedure, the deciphered control words Cwi are generated by the deciphering circuit 27 in such a way as to allow the descrambling of the scrambled item IE (ECG).

As mentioned earlier, piracy in relation to a single user card, thereby allowing access to the key K, leads to destruction of the protection of the set of services supplied by the provider.

SUMMARY OF THE INVENTION

The present invention relates to a novel conditional access system More particularly, the invention relates to a novel definition of the EMMs as well as to a novel definition of the various functions contained in the user card.

Thus, the invention relates to a message (EMM) making it possible to define the entitlements which a user possesses to a service consisting of an item scrambled with the aid of control words, the control words being supplied to the user after having been enciphered by an algorithm with key K, the message (EMM) containing an item making it possible to validate this message and to verify that the entitlements which the latter contains are the entitlements reserved for the user. The message (EMM) contains the key K of the algorithm for enciphering the control words.

The invention also relates to a process making it possible to descramble a scrambled service supplied to at least one user, the said service being scrambled with the aid of control words, the said process comprising a step making it possible to supply the user with a first message (ECM) containing at least one control word enciphered with an algorithm with key K, a step making it possible to supply the user with a second message (EMM) containing the entitlements of the user and a step making it possible to validate and verify that the entitlements contained in the second message (EMM) are the entitlements reserved for the user. The key K is dispensed to the user in the second message (EMM).

The invention also relates to a smartcard making it possible to decipher the enciphered control words which it receives, the control words being enciphered by an algorithm with key K, and making it possible, after deciphering, to descramble a scrambled service, the card comprising a circuit for validating the entitlements of the user containing a first control key making it possible to control the validation of the entitlements of the user and a circuit for validating the access conditions associated with the service, the circuit for validating the access conditions containing a second control key. The first control key is different from the key K. According to the preferred embodiment of the invention the first control key is a key individual to the card and hence different from one card to another.

The invention further relates to a conditional access system allowing a service provider to supply services only to the users who have acquired entitlements to these services, the said services consisting of an item scrambled by control words, the said system comprising, for each user, at least one decoder and at least one user card, the said card containing, on the one hand, circuits making it possible to validate and record the entitlements of the user to the service delivered by the provider, the said entitlements being conveyed to the user card by a first message (EMM) and, on the other hand, circuits making it possible to retrieve the control words from the enciphered control words by an algorithm with key K, the said enciphered control words being conveyed to the user card by a second message (ECM). The user card is a card such as that according to the abovementioned invention and the first message (EMM) is a message making it possible to define the entitlements possessed by the user such as that according to the abovementioned invention.

An advantage of the invention is considerably to strengthen the protection of the services supplied by the provider. Piracy in relation to one or more user cards then offers practically no benefit to a would-be pirate any more.

BRIEF DESCRIPTION OF THE DRAWINGS

In all the figures, the same labels designate the same elements.

DESCRIPTION OF THE PREFERRED EMBODIMENTS

Figure 1A:
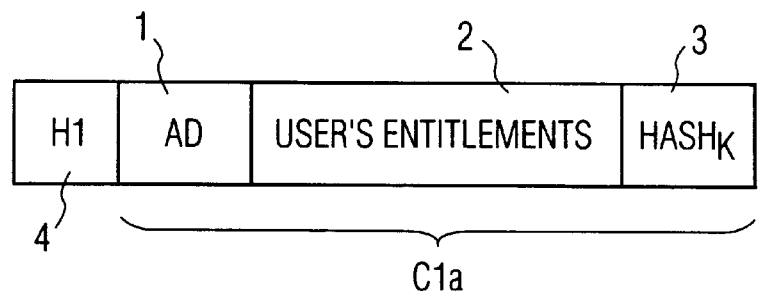
FIGS. 1a and 1b represent respectively first and second prior art EMM formats.
Figure 1B:
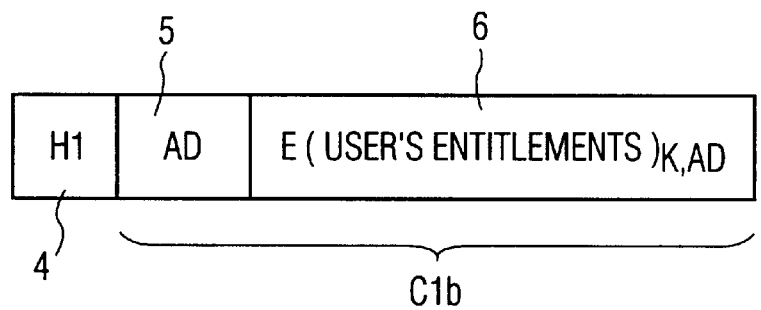
Figure 2:
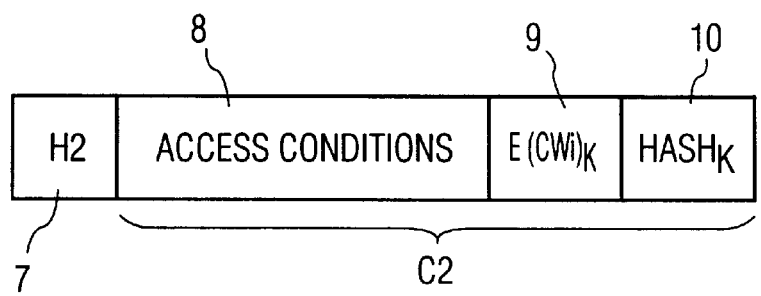
FIG. 2 represents a prior art ECM format.
Figure 3:
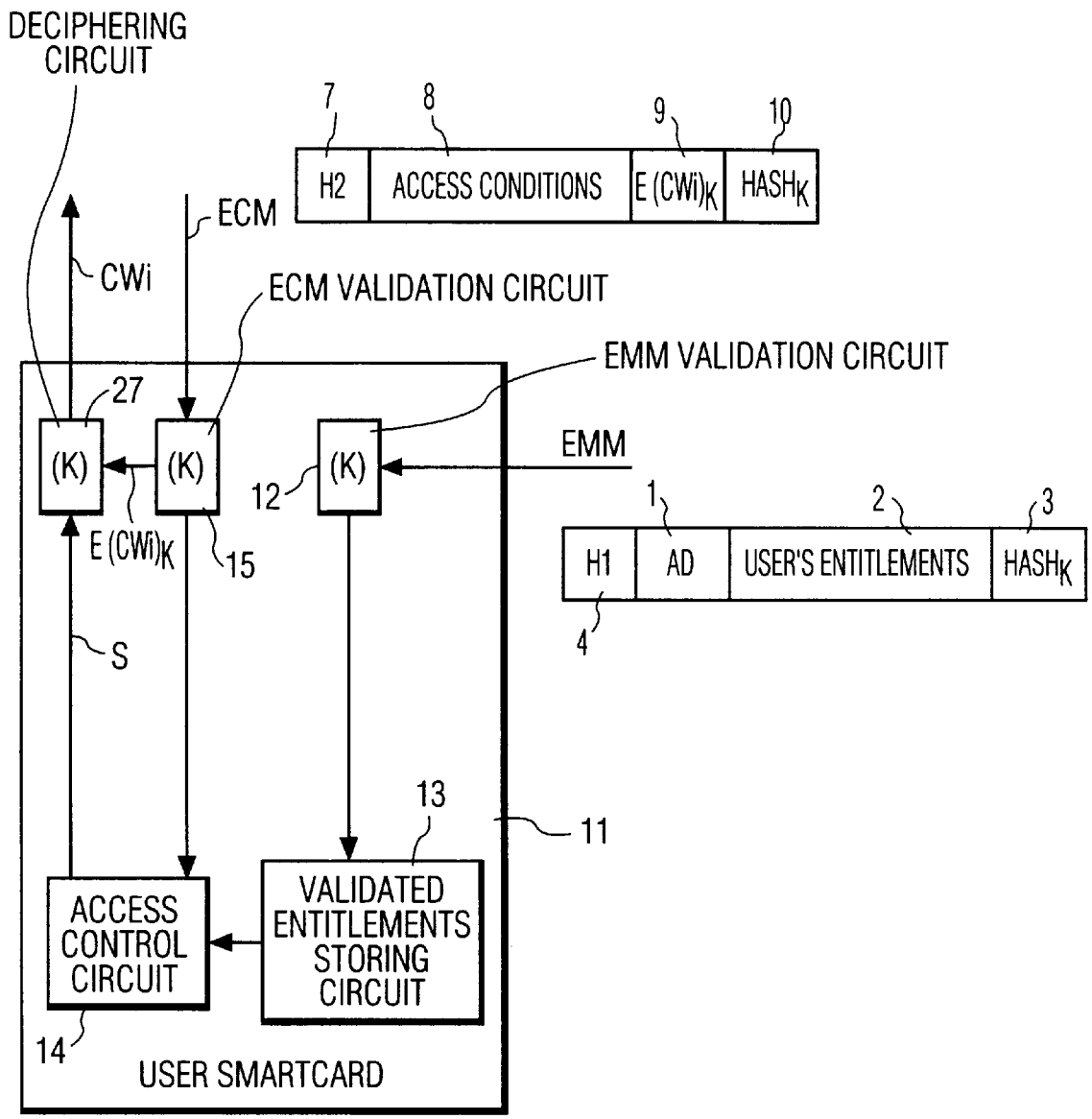
FIG. 3 represents a prior art schematic of a user or smart card.
Figure 4A:
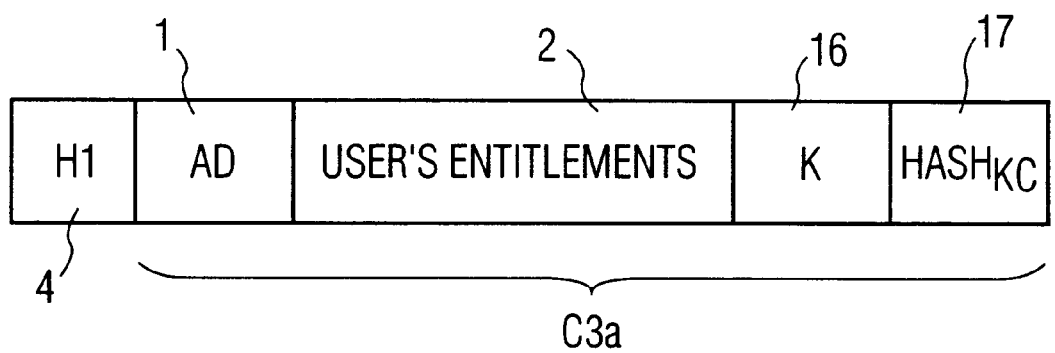
FIGS. 4a and 4b represent respectively a first EMM format and a second EMM format according to the invention.

FIG. 4a represents a first EMM format according to the invention.

The body C3a of the user's EMM is here composed of four main items:

the items 1 and 2 constituting respectively the user's address and the description of the user's entitlements;

an item 16 containing the key K of the algorithm for enciphering the control words;

an item 17 containing a hash cue $HASH_{KC}$, where KC is a different key from the key K. According to the preferred embodiment of the invention, the key KC is individual to each user and therefore different from one card to another. According to other embodiments, the key KC is individual to a group of user cards.

Figure 4B:
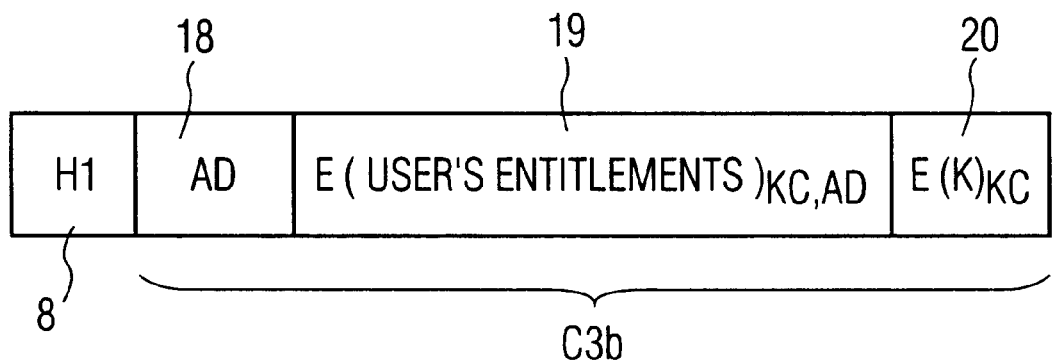

FIG. 4b represents a second EMM format according to the invention.

The body C3b of the EMM comprises three main items:

the items 18 and 19 constituting respectively the address AD of the user card and the description of the user's entitlements encrypted with the algorithm with key KC and relating to the address AD (E(user's entitlements)$_{KC_{AD}}$). The key KC differs from the key K. According to the preferred embodiment of the invention, the key KC is individual to each user card and therefore different from one card to another. According to other embodiments, the key KC is individual to a group of user cards.

According to this EMM format, the validation and verification of the entitlements contained in the EMM are performed by the operation for deciphering the enciphered entitlements.

an item 20 containing the key K for enciphering the control words enciphered with the algorithm with key KC (E(K)$_{KC}$).

Advantageously, regardless of the format of the EMM, the key K for enciphering the control words is not contained in the user's card so long as the EMMs have not been transmitted to the user.

Figure 5:
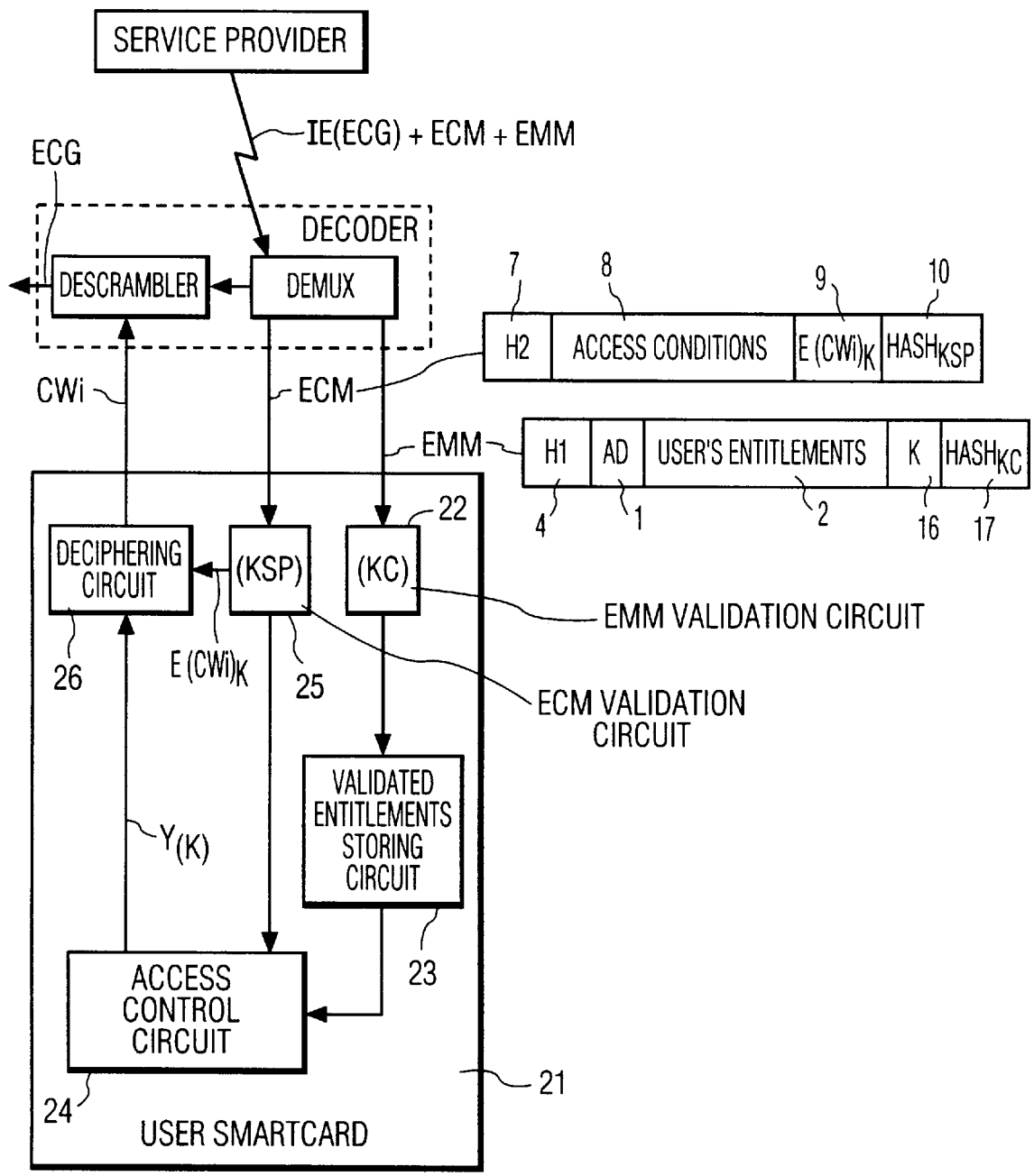
FIG. 5 represents the schematic of a user card according to the invention.

FIG. 5 represents the schematic of a user card according to the invention as well as the ECMs and the EMMs according to the invention.

The user card 21 contains five main circuits:

a circuit 22 for validating the user's entitlements;

a circuit 23 for storing the user's validated entitlements;

a circuit 24 for controlling the access;

a circuit 25 for validating the ECMs;

a circuit 26 for deciphering the enciphered control words.

The EMM of FIG. 5 is of the type represented in FIG. 4a. The user card according to the invention can however operate with EMMs such as those represented in FIG. 4b.

According to the invention, the EMMs are analysed with the aid of a validation algorithm controlled by the key KC. The key KC is contained in the validation circuit 22.

The ECMs are, for their part, analysed with the aid of a validation algorithm controlled by a key KSP. For this purpose, within the framework of the invention, the ECMs contain an item 28 containing a cue HASH$_{KSP}$ dependent on the key KSP. The key KSP is contained in the validation circuit 25. The key KSP differs from the key K. According to the preferred embodiment of the invention, the key KSP is individual to the service provider.

The access control circuit 24 compares the validated access conditions with the validated entitlements of the user.

If the validated access conditions correspond to the validated entitlements of the user, a signal Y(K) emanating from the access control circuit 24 and applied to the deciphering circuit 26 authorizes the deciphering of the control words. The signal Y(K) contains the key K so as to transmit the latter to the deciphering circuit 26. The enciphered control words E(Cwi)$_K$ are forwarded from the validation circuit 25 to the deciphering circuit 26. The deciphering of the control words is then performed. On completion of the various steps of the deciphering procedure, the deciphered control words Cwi are generated by the deciphering circuit 26 so as to allow the descrambling of the scrambled item.

If the validated access conditions do not correspond to the validated entitlements of the user, the deciphering of the control words is not authorized.

According to the invention, validation of a user's entitlements is controlled by a key KC individual to the user or to a group of users. It follows that piracy in relation to a user card can lead only to the jeopardizing of the pirated card itself as well as the user cards of the same group of users if the key KC is shared by one and the same group of users.

Advantageously, all the other user cards remain protected.

According to the above-described embodiment of the invention, the key K is the same for all the services supplied by the provider. The invention allows the implementation of embodiments for which the various services supplied by the provider are scrambled with control words enciphered with an algorithm whose enciphering key differs from one service to another or from one group of services to another.

This is particularly advantageous in the case of systems commonly referred to as "off-line" systems for which the scrambled item IE(ECG) and the ECMs are contained on stand-alone data media such as, for example, CDs ("Compact Discs"), DVDs ("Digital Video Discs") or else CD-ROMs ("Compact-Disc Read Only Memories").

Advantageously, piracy in relation to a user card is then even more devoid of benefit than in the case in which all the services of the provider are scrambled with control words enciphered with the same key K. Thus, piracy in relation to a user card then leads to only very partial access in respect of the various services supplied by the provider.

Scrambling various services, such as for example films, with an algorithm whose keys differ from one service to another cannot be envisaged within the framework of prior art conditional access systems for which the key of the algorithm for enciphering the control words of a service and the key associated with the algorithm for validating the user's entitlements are identical.

Thus, the service provider would then have to supply each user with a card individual to each service or group of services. Such a proliferation of cards is unrealistic, both for practical reasons and for cost reasons.

Generally, regardless of the embodiment of the invention, that is to say whether the various services supplied by the provider are associated with a single key for enciphering the control words K or with different enciphering keys K$_j$ (j=1, 2, ..., m), the invention relates equally well to conditional access systems of the "off-line" type as to conditional access systems of the "on-line" type for which the scrambled item IE(ECG) is an item consisting of a signal dispensed simultaneously to the various customers of the service provider from a single source.

What is claimed is:

1. A method for descrambling a service scrambled using a control word, said method comprising the steps of:

supplying a first message containing access conditions associated with a user and said control word enciphered using a key;

supplying a second message containing the entitlements associated with said user and said key;

validating and verifying said access conditions with respect to said entitlements using a subsequent key, said subsequent key being different from said key and being individual to one of each of said user and groups of users;

descrambling said control word in response to said validated and verified access condition; and descrambling said scrambled service in response to said descrambled control word.

2. The method of claim 1 wherein the steps of validating and verifying, descrambling said control word and descrambling said scrambled service are performed in a smart card.

3. A smart card for providing a control word for descrambling a received scrambled service comprises:

means for receiving a first message, said first message containing data corresponding to access conditions associated with a user and said control word associated with said scrambled service, said control word being enciphered using a first key;

means for validating said first message using a second key, said second key being different from said first key;

means for receiving a second message, said second message containing data corresponding to entitlements associated with said user;

means for validating said second message using a third key, wherein said second key is different from said third key;

means for descrambling said scrambled control word in response to the validations of said first and second messages.

4. The smart card according to claim 3 wherein said third key is associated with one of an individual smart card and a group of smart cards.

5. The smart card according to claim 3, wherein said second key is associated with said service provider.

6. A Conditional access system for selectively supplying services to a user comprises:

means for providing a service scrambled using a control word, data associated with said user's entitlements and data associated with access conditions, said access conditions comprising a control word scrambled using a key, said entitlement data comprising said key;

a decoder for descrambling said scrambled service;

a smart card for receiving said entitlement data and said access condition data and for providing said control word to said decoder, said smart card descrambles said scrambled control word using said key in response to the validation of said entitlement data and said access condition data using a subsequent key, said subsequent key being different from said key and being individual to one of each of said user and groups of users.

7. The system according to claim 6, wherein said system is an "on-line" type.

8. The system according to claim 6, wherein said system is an "off-line" type.

* * * * *